(12) United States Patent
Kunisawa et al.

(10) Patent No.: US 7,829,621 B2
(45) Date of Patent: Nov. 9, 2010

(54) RUBBER COMPOSITION AND TIRE COMPRISING THE SAME

(75) Inventors: Tetsuya Kunisawa, Kobe (JP); Toshiro Matsuo, Kobe (JP); Takuya Horiguchi, Kobe (JP); Takashi Nakamura, Kobe (JP)

(73) Assignee: Sumitomo Rubber Industries, Ltd., Kobe-Shi Hyogo-Ken (JP)

( * ) Notice: Subject to any disclaimer, the term of this patent is extended or adjusted under 35 U.S.C. 154(b) by 0 days.

(21) Appl. No.: 11/234,261

(22) Filed: Sep. 26, 2005

(65) Prior Publication Data

US 2006/0094815 A1 May 4, 2006

(30) Foreign Application Priority Data

Nov. 1, 2004 (JP) ............................. 2004-317972

(51) Int. Cl.
*C08C 19/16* (2006.01)
*C08K 5/01* (2006.01)
*C08K 3/04* (2006.01)
*B60C 1/00* (2006.01)

(52) U.S. Cl. ...................................... 524/482; 524/495

(58) Field of Classification Search ................ 524/493, 524/495, 496, 482
See application file for complete search history.

(56) References Cited

U.S. PATENT DOCUMENTS

| 4,471,093 | A | * | 9/1984 | Furukawa et al. | 525/237 |
| 5,500,482 | A | | 3/1996 | Muraki et al. | |
| 5,959,039 | A | * | 9/1999 | Yokoyama et al. | 525/236 |
| 6,147,143 | A | * | 11/2000 | Araki et al. | 523/213 |
| 6,489,389 | B1 | * | 12/2002 | Ohta et al. | 524/437 |
| 2005/0154156 | A1 | | 7/2005 | Karato et al. | |
| 2006/0167160 | A1 | * | 7/2006 | Nakagawa et al. | 524/442 |

FOREIGN PATENT DOCUMENTS

| EP | 1 514 901 A1 | | 3/2005 |
| JP | 62-1735 A | | 1/1987 |
| JP | 6-200075 A | | 7/1994 |
| JP | 10-60178 A | | 3/1998 |
| JP | 11-246711 A | | 9/1999 |
| JP | 2000-289407 A | | 10/2000 |
| JP | 2001-240704 A | | 9/2001 |
| JP | 2002-114871 A | | 4/2002 |
| JP | 2002-114874 A | | 4/2002 |
| JP | 2002-322317 A | | 11/2002 |
| JP | 2003-268041 A | | 9/2003 |
| JP | 2003253051 A | * | 9/2003 |

OTHER PUBLICATIONS

Brendan Rodgers, Walter H. Waddell, William Klingensmith; Rubber Compounding, Encyclopedia of Polymer Science and Technology; Jul. 15, 2004; John Wiley & Sons, Inc.; p. 629.*
Sartomer Datasheet for RICON 100.*
Database WPI, Section Ch, Week 19970, Derwent Publications Ltd., London, GB; AN 1997-431576- XP002358726.

* cited by examiner

*Primary Examiner*—Mark Eashoo
*Assistant Examiner*—Angela C Scott
(74) *Attorney, Agent, or Firm*—BIrch Stewart Kolasch & Birch, LLP

(57) ABSTRACT

A rubber composition which provides an improved balance in grip performance, grip durability and abrasion resistance, and a tire and/or tire tred made from the same Wherein the rubber composition includes a diene rubber, 50 to 120 parts by weight of a reinforcing agent containing particular carbon black and 10 to 100 parts by weight of silica based on 100 parts by weight of a the diene rubber, 2 to 50 parts by weight of a styrene-butadiene polymer, in which weight average molecular weight is 1,000 to 15,000, the amount of a styrene being 17 to 27% by weight and the amount of vinyl being 60 to 80% by weight, and 2 to 25 parts by weight of an indene resin, in which the melting point is 100 to 150° C., based on 100 parts by weight of the diene rubber which includes at least 60% by weight of a particular solution polymerization styrene-butadiene rubber and at most 40% by weight of a natural rubber and/or a butadiene rubber.

3 Claims, No Drawings

RUBBER COMPOSITION AND TIRE COMPRISING THE SAME

BACKGROUND OF THE INVENTION

The present invention relates to a rubber composition and a tire comprising the same, and specifically, relates to a rubber composition which can prepare a tire having improved grip performance, grip durability and abrasion resistance.

Recently, further improvement in grip performance is required for a tire along with high performance of vehicle.

However, there was a problem that abrasion resistance is lowered by improving grip performance. Also, grip performance tended to be lowered (grip durability was low) along with time due to repeating a long-time running.

A rubber composition for a tire containing a liquid polymer having a specific molecular weight is described in Japanese Unexamined Patent Publication JP-A-No. 06-200075, but the rubber composition could not improve the grip performance, grip durability and abrasion resistance with a good balance.

Thus, it is a current situation that a tire improving grip performance, grip durability and abrasion resistance with a good balance is not obtained.

SUMMARY OF THE INVENTION

It is an object of the present invention to provide a rubber composition improving grip performance, grip durability and abrasion resistance with a highly good balance and a tire comprising the same.

The present invention relates to a rubber composition comprising:

50 to 120 parts by weight of a reinforcing filler containing carbon black, of which nitrogen adsorbing-specific surface area is 100 to 250 m²/g, an iodine adsorption amount is 110 to 200 mg/g and a ratio of cetyltrimethylammonium bromide adsorbing-specific surface area to the iodine adsorption amount is 0.85 to 1.2, and 10 to 100 parts by weight of silica based on 100 parts by weight of a diene rubber;

2 to 50 parts by weight of a styrene-butadiene polymer, of which weight average molecular weight is 1,000 to 15,000, the amount of a styrene is 17 to 27% by weight and the amount of vinyl is 60 to 80% by weight; and 2 to 25 parts by weight of an indene resin, of which the melting point is 100 to 150° C., based on 100 parts by weight of a diene rubber comprising at least 60% by weight of a solution polymerization styrene-butadiene rubber, of which weight average molecular weight is 500,000 to 2,500,000, the amount of styrene is 20 to 40% by weight and the amount of vinyl is 30 to 60% by weight, and at most 40% by weight of a natural rubber and/or a butadiene rubber.

The above-described rubber composition further contains preferably 2 to 12 parts by weight of a silane coupling agent represented by the following formula:

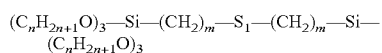

(wherein n is an integer of 1 to 3, m is an integer of 1 to 4 and the average value of 1 is 1.8 to 3.5), based on 100 parts by weight of the above-described silica and is obtained by kneading at condition of at least 150° C.

Also, the present invention relates to a tire having tread comprising the above-described rubber composition.

DETAILED DESCRIPTION

The rubber composition of the present invention comprises a diene rubber, a reinforcing filler, a styrene-butadiene polymer and an indene resin.

The diene rubber comprises a solution-polymerized styrene-butadiene rubber (S-SBR) and a natural rubber (NR) and/or a butadiene rubber (BR).

S-SBR is obtained by solution polymerization. As SBR, those which is obtained by emulsion polymerization (an emulsion polymerization SBR) are also known, but the emulsion-polymerized SBR contains an emulsifier and it is disadvantageous to grip decrease (phenomenon in which steering stability is deteriorated since a tire rubber generates heat by running). Further, since S-SBR is inferior in low fuel consumption to the solution-polymerized SBR, SBR obtained by solution polymerization is used.

Weight average molecular weight (Mw) of S-SBR is at least 500,000 and preferably at least 600,000. When Mw is less than 500,000, it is not preferable since abrasion resistance is deteriorated. Further, Mw is at most 2,500,000, preferably at most 2,000,000 and more preferably at most 1,500,000. When Mw is more than 2,500,000, processability is remarkably deteriorated in a process of kneading and, also, since S-SBR has a high molecular weight, preparations by current polymer preparation techniques are difficult; therefore, S-SBR tends to be at a high cost.

As S-SBR, those which are made to have a high molecular weight by coupling with tin or silicon are preferable. An example of the coupling process is a process of reacting an alkali metal (such as Li) or an alkali earth metal (such as Mg) at the terminal of S-SBR molecular chain with tin halide or silicon halide, according to conventional processes.

The amount of styrene of S-SBR is at least 20% by weight and preferably at least 25% by weight. When the amount of styrene is less than 20% by weight, grip performance is lowered. Further, the amount of styrene is at most 40% by weight. When the amount of styrene is more than 40% by weight, a rubber becomes hard at a tire running at a low temperature and the lowering of the grip performance is caused. Herein, the amount of styrene is obtained by measuring ¹H NMR by using an NMR device and calculating from phenyl proton based on a styrene unit at 6.7 to 7.2 ppm which was determined from the spectrum of the obtained S-SBR.

The amount of vinyl of S-SBR (the part of butadiene) is at least 30% by weight and preferably at least 35% by weight. When the amount of vinyl is less than 30% by weight, it is not preferable since grip performance is lowered. Further, the amount of vinyl is at most 60% by weight and preferably at most 55% by weight. When the amount of vinyl is more than 60% by weight, low fuel consumption is not achieved. Herein, the amount of vinyl is obtained by measuring ¹H NMR by using an NMR device and calculating from the methylene proton of a vinyl bond based on a butadiene unit at 4.7 to 5.2 ppm which is determined from the spectrum of the obtained S-SBR.

The amount of S-SBR is at least 60% by weight in the diene rubber and preferably at least 70% by weight. When the amount is less than 60% by weight, it is not preferable since grip performance is lowered. Also, the amount of S-SBR is more preferably at most 95% by weight. When the amount is more than 95% by weight, the rubber becomes hard at tire running at a low temperature and grip performance tends to be lowered.

The amount of NR and/or BR is preferably at least 5% by weight in the diene rubber and more preferably at least 10% by weight. When the amount is less than 5% by weight, a brittleness temperature becomes high and a rubber tends to be cracked at using in extreme cold. Also, the amount of NR and/or BR is at most 40% by weight in the diene rubber and preferably at most 35% by weight. When the amount is more than 40% by weight, it is not preferable since grip is lowered.

As the diene rubber, a polyisoprene rubber (IR), an ethylene-propylene-diene rubber (EPDM), a chloroprene rubber (CR), an acrylonitrile-butadiene rubber (NBR), a butyl rubber (IIR) and the like can be also used other than the above-described S-SBR, BR and NR.

The reinforcing filler comprises carbon black and silica.

The nitrogen adsorbing-specific surface area ($N_2SA$) of carbon black is at least 100 $m^2/g$ and preferably at least 110 $m^2/g$. When $N_2SA$ is less than 100 $m^2/g$, reinforcing properties are lowered; therefore, abrasion resistance and grip performance are lowered. Also, $N_2SA$ is at most 250 $m^2/g$ and preferably at most 240 $m^2/g$. When $N_2SA$ is more than 250 $m^2/g$, low fuel consumption tends not to be achieved.

The iodine adsorption amount (IA) of carbon black is at least 110 mg/g and preferably at least 115 mg/g. When IA is less than 110 mg/g, abrasion resistance and grip performance are lowered. Also, IA is at most 200 mg/g and preferably at most 195 mg/g. When IA is more than 200 mg/g, low fuel consumption can not be achieved and processability is deteriorated.

Cetyltrimethylammonium bromide (CTAB) adsorbing-specific surface area of carbon black is preferably 94 to 240 ml/100 g. When the CTAB adsorbing specific surface area is less than 94 ml/100 g, abrasion resistance and grip performance tend to be lowered and when it is more than 240 ml/100 g, low fuel consumption can not be achieved and processability tends to be deteriorated.

The ratio (CTAB/IA) of the cetyltrimethylammonium bromide (CTAB) adsorbing-specific surface area to the iodine adsorption amount (IA) is at least 0.85 and preferably at least 0.87. When CTAB/IA is less than 0.85, low fuel consumption can not be achieved. Also, CTAB/IA is at most 1.2 and preferably at most 1.15. When CTAB/IA is more than 1.2, grip decrease is deteriorated.

The amount of carbon black is preferably at least 20 parts by weight based on 100 parts by weight of the above-described diene rubber and more preferably at least 25 parts by weigh. When the amount is less than 20 parts by weight, grip performance and abrasion resistance on a dry road surface tend to be lowered. Also, the amount of carbon black is preferably at most 100 parts by weight and more preferably at most 95 parts by weigh. When the amount is more than 100 parts by weight, viscosity of the rubber is raised and processability tends to be deteriorated.

As silica, there is not a particular limitation, and those which are prepared by a wet process or a dry process can be used.

The amount of silica is at least 10 parts by weight based on 100 parts by weight of the above-described diene rubber, preferably at least 15 parts by weight and more preferably at least 25 parts by weight. When the amount is less than 10 parts by weight, grip performance becomes inferior. Also, the amount of silica is at most 100 parts by weight and preferably at most 95 parts by weight. When the amount is more than 100 parts by weight, viscosity of the rubber is raised; thus, processability is deteriorated.

The amount of the reinforcing filler is at least 50 parts by weight based on 100 parts by weight of the above-described diene rubber and preferably at least 55 parts by weight. When the mount is less than 50 parts by weight, it is not preferable since abrasion resistance and grip performance are low. Further, the amount of the reinforcing filler is at most 120 parts by weight and preferably at most 115 parts by weight. When the amount is more than 120 parts by weight, low fuel consumption can not be achieved.

As the reinforcing filler, along with those except for the above-described carbon black and silica, calcium carbonate, clay and the like can be used.

The rubber composition of the present invention can use a combination of a silane coupling agent with silica.

When the above-described diene rubber and the reinforcing filler are kneaded, it is preferable that a reaction temperature in a kneader (such as Banbury mixer) is highly set to carry out the reaction of silica with the diene rubber efficiently. Specifically, it is preferable that the temperature is set at least 150° C. and, in particular, 160 to 180° C. When the reaction temperature is less than 150° C., the reaction of silica with a silane coupling agent tends to be hardly completed, and when the temperature is more than 180° C., viscosity of the rubber at kneading tends to be excessively raised.

In this case, the silane coupling agent represented by the following formula:

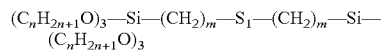

(wherein n is an integer of 1 to 3, m is an integer of 1 to 4 and the average value of 1 is 1.8 to 3.5), can be used as the silane coupling agent for silica in place of a conventional Si69 (four sulfur atoms in one molecule) and the like. An example of silane coupling agent satisfying the formula is Si266 (contains two sulfur atoms in one molecule, high purity) and the like.

It is preferable to use 2 to 12 parts by weight of the silane coupling agent based on 100 parts by weight of silica. When the amount of silane coupling agent is less than 2 parts by weight, performance of silica can not be brought out sufficiently and wet grip performance and abrasion resistance tend to be inferior, and when the amount of the silane coupling agent is more than 12 parts by weight, the silane coupling agent is excessive and costs high, and abrasion resistance tends to be inferior.

The rubber composition of the present invention uses a styrene-butadiene polymer as a softening agent. There are similar diene polymers such as an isoprene polymer and a butadiene polymer other than the styrene-butadiene polymer, but when these are used, a disadvantage of which the grip performance is lowered is occurred; therefore, the styrene-butadiene polymer is used in the present invention.

Weight average molecular weight (Mw) of the styrene-butadiene polymer is at least 1,000 and preferably at least 1,500. When Mw is less than 1,000, it is risky since the styrene-butadiene polymer blooms out on the surface of the rubber. Also, Mw of the styrene-butadiene polymer is at most 15,000, preferably at most 13,000 and more preferably at most 10,000. When Mw is more than 15,000, viscosity of the rubber increases and processability is deteriorated.

The amount of styrene of the styrene-butadiene polymer is at least 17% by weight and preferably at least 19% by weight. When the amount of styrene is less than 17% by weight, lowering of grip tends to be caused. Also, the amount of styrene of the styrene-butadiene polymer is at most 27% by weight and preferably at most 25% by weight. When the amount of styrene is more than 27% by weight, viscosity of the rubber increase and processability tends to be deteriorated.

The amount of vinyl of the styrene-butadiene polymer is at least 60% by weight and preferably at least 65% by weight. When the amount of vinyl is less than 60% by weight, grip tends to be lowered. Also, the amount of vinyl of the styrene-butadiene polymer is at most 80% by weight and preferably at most 75% by weight. When the amount of vinyl is more than 80% by weight, it is not preferable since grip and a crosslinking density tend to decrease and the rubber becomes soft.

The amount of the styrene-butadiene polymer is at least 2 parts by weight based on 100 parts by weight of the diene rubber and preferably at least 3 parts by weight. When the amount is less than 2 parts by weight, improvement in grip cannot be expected. Also, the amount of the styrene-butadiene polymer is at most 50 parts by weight based on 100 parts by weight of the diene rubber, preferably at most 45 parts by weight and more preferably at most 40 parts by weight. When the amount is more than 50 parts by weight, the rubber becomes excessively soft; therefore, steering stability and abrasion resistance tend to be deteriorated.

An example of the indene resin is specifically a coumarone indene resin and, among these, since the grip performance becomes high, it is preferable to use the coumarone indene resin.

As a tackifier resin, examples such as an aromatic petroleum resin (a resin of C9 distillate), a terpene resin, an aromatic modified terpene resin, a rosin resin, a phenol resin, a petroleum resin (a resin of C5 distillate) other than indene resins are generally used, but since disadvantage of which the grip performance and grip durability cannot be improved in a good balance by using the tackifier resin except for the indene resin in the present invention is occurred, the indene resins are used in the present invention.

The meting point of the indene resin is at least 100° C. and preferably at least 110° C. When the meting point is less than 100° C., the rubber becomes excessively soft during running; therefore, steering stability tends to be deteriorated. The meting point of the indene resin is at most 150° C. and preferably at most 140° C. When the meting point is more than 150° C., there is fear of deterioration of processability by increasing the viscosity of the rubber.

The amount of the indene resin is at least 2 parts by weight based on 100 parts by weight of the diene rubber and preferably at least 3 parts by weight. When the amount is less than 2 parts by weight, abrasion resistance, dry grip and grip durability are not improved. Also, the amount of the indene resin is at most 25 parts by weight based on 100 parts by weight of the diene rubber and preferably at most 23 parts by weight. When the amount is more than 25 parts by weight, it is not preferable since the abrasion resistance tends to be deteriorated.

The rubber composition of the present invention can contain a softening agent such as an oil, a vulcanizing agent such as sulfur, an antioxidant, wax, stearic acid, zinc oxide and a vulcanization accelerator other than the above-described diene rubber, the reinforcing filler, the silane coupling agent, the styrene-butadiene polymer and the indene resin.

The rubber composition of the present invention is prepared by a general process. Namely, after kneading the above-described compounding agents and an additive, if necessary, with a ban bury mixer, an open roll and the like, the rubber composition can be prepared by vulcanizing the mixture.

The toluene swelling rate of the rubber composition of the present invention is preferably at least 180% and more preferably at least 220%. When the toluene swelling rate is less than 180%, durability of the rubber becomes inferior and abrasion resistance tends to be deteriorated. Also, the toluene swelling rate is preferably at most 320% and more preferably at most 310%. When the toluene swelling rate is more than 320%, grip performance and effects of lowering rolling resistance tend to become inferior. Herein, the toluene swelling rate is obtained by immersing a rubber cube in which one side is adjusted at about 5 mm in toluene for 24 hours and, then, measuring weight ratios before immersion and after immersion.

The tire of the present invention has tread comprising the above-described rubber composition.

The tire of the present invention is prepared by a general process in tire industries. Namely, after kneading as mentioned above, the obtained kneaded product is molded in a shape of a tread on a tire molding machine, and laminated with other tire parts and, then, the tire of the present invention can be prepared by vulcanization.

EXAMPLES

The present invention is explained in detail in Examples, but is not limited only thereto.

Various chemicals used in Examples are shown below.

SBR: T4350 available from ASAHI KASEI CORP. (weight average molecular weight: 600,000 to 1,000,000, amount of styrene: 39% by weight, amount of vinyl: 38% by weight, amount of an oil: 33.3% by weight)

BR: BR available from Ube Industries, Ltd.

Carbon black: N110 available from SHOWA CABOT K. K. (a nitrogen adsorbing-specific surface area: 130 m$^2$/g, an iodine adsorption amount: 145 mg/g, a ratio of a cetyltrimethylammonium bromide adsorbing-specific surface area to the iodine adsorption amount: 0.87).

Silica: ULTRASIL VN3 available from Degussa Co.

Silane coupling agent: Si266 (bis (3-triethoxysilylpropyl) disulfide) (average value of 1 in the formula: 2.2) available from Degussa Co.

$(C_2H_5O)_3$—Si—$(CH_2)_3$—$S_1$—$(CH_2)_3$—Si—$(OC_2H5)_3$

Process oil: Diana Process PS 32 available from Idemitsu Kosan Co., Ltd.

Wax: SUNNOC Wax available from Ouchi Shinko Chemical Industrial Co., Ltd.

Antioxidant: SANTOFLEX 13 available from FLEXSYS Co.

Stearic acid: Poulownia (KIRI) available from NOF Corporation

Zinc flower: ZINC OXIDE NO. 2 available from Mitsui Mining And Smelting Co., Ltd.

Styrene-butadiene polymer: Ricon 100 (weight average molecular weight: 4,000 to 5,000, amount of styrene: 20% by weight, amount of vinyl: 70% by weight) available from Sartomer Company Inc.

Resin: ESCURON V120 (a coumarone indene resin, a melting point: 120° C.) available from Nippon Steel Chemical Co., Ltd.

Sulfur: Sulfur powder available from Tsurumi Chemicals Co., Ltd.

Vulcanization accelerator 1: NOCCELER NS available from Ouchi Shinko Chemical Industrial Co., Ltd.

Vulcanization accelerator 2: SOXINOL D available from Sumitomo Chemical Co., Ltd.

(Preparation of Rubber Composition)

After the composition contents in Table 1 excluding sulfur and a vulcanization accelerator were kneaded at 165° C. using a 1.7 L banbury mixer made by Kobe Steel, Ltd., sulfur and a vulcanization accelerator were added to the obtained kneaded products, and the mixture kneaded at 110° C. with a twin roller was vulcanized at 175° C. for 10 min to prepare the rubber compositions.

<Measurement Items>

(Abrasion Resistance)

Abrasion quantity was measured from the prepared rubber composition under conditions of a room temperature, a loading weight of 2.0 kgf and a slip rate of 30% by using a lambourn abrasion tester. The reciprocal number of the abrasion quantity was represented as an index, regarding Comparative Example as 100. The larger the value is, the higher abrasion resistance is.

Tires with a size of 215/40R17 having a tread comprising the above-described rubber composition were prepared. Measurement below was conducted using a vehicle loaded with the tires.

(Dry Grip)

In-vehicle running on a test track of a dry asphalt road surface was carried out and, about grip performance (grip feeling, brake performance and traction performance) at this running, feeling evaluations in the following five stages were conducted.
5: Very good
4: Good
3: Normal
2: Slightly inferior
1: Inferior (Grip Durability)

In-vehicle running on a test track of a dry asphalt road surface was conducted and feeing evaluations in the following five stages were conducted about lowering of grip performance (grip feeling, brake performance and traction performance) when repeating running the track.
5: Very good
4: Good
3: Normal
2: Slightly inferior
1: Inferior The results are shown in Table 1.

TABLE 1

|  | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Composition (parts by weight) | | | | | | | |
| SBR | 120 | 120 | 120 | 120 | 120 | 120 | 120 |
| BR | 20 | 20 | 20 | 20 | 20 | 20 | 20 |
| Carbon black | 70 | 70 | 70 | 70 | 70 | 70 | 70 |
| Silica | 40 | 40 | 40 | 40 | 40 | 40 | 40 |
| Silane coupling agent | 3.2 | 3.2 | 3.2 | 3.2 | 3.2 | 3.2 | 3.2 |
| Process oil | 10 | 10 | 10 | 10 | 10 | 10 | 10 |
| Wax | 2 | 2 | 2 | 2 | 2 | 2 | 2 |
| Antioxidant | 2 | 2 | 2 | 2 | 2 | 2 | 2 |
| Stearic acid | 2 | 2 | 2 | 2 | 2 | 2 | 2 |
| Zinc flower | 2.5 | 2.5 | 2.5 | 2.5 | 2.5 | 2.5 | 2.5 |
| Styrene-butadiene polymer | 2 | 10 | 50 | 0 | 10 | 0 | 55 |
| Resin | 2 | 10 | 25 | 0 | 0 | 10 | 30 |
| Sulfur | 2.5 | 2.5 | 2.5 | 2.5 | 2.5 | 2.5 | 2.5 |
| Vulcanization accelerator 1 | 2 | 2 | 2 | 2 | 2 | 2 | 2 |
| Vulcanization accelerator 2 | 1 | 1 | 1 | 1 | 1 | 1 | 1 |
| Evaluation | | | | | | | |
| Abrasion resistance (index) | 100 | 105 | 100 | 100 | 102 | 98 | 95 |
| Dry grip | 4 | 4.5 | 5 | 3 | 3.5 | 4 | 5 |
| Grip durability | 4 | 4.5 | 5 | 3 | 3.5 | 2.5 | 5 |

Abrasion resistance, dry grip and grip durability are improved with a highly good balance in Examples 1 to 3, in which a combination of Ricon 100 and V120 in an appropriate amounts are used.

Abrasion resistance, dry grip and grip durability are slightly improved in Comparative Example 2, in which only Ricon 100 is used against Comparative Example 1, but does not reach to showing sufficient performance.

In Comparative Example 3, in which only V120 is used, although the dry grip is improved, abrasion resistance and grip durability are slightly lowered.

Abrasion resistance is slightly deteriorated in Comparative Example 4, in which a combination of Ricon 100 and V120 are used excessively in the range of the appropriate amount.

According to the present invention, the grip performance, the grip durability and abrasion resistance of a tire in which the rubber composition is used as a tread can be improved with a good balance by compounding specific amounts of a particular styrene-butadiene polymer and an indene resin with a rubber composition containing a diene rubber and a reinforcing filler.

What is claimed is:

1. A rubber composition comprising:
a diene rubber, 50 to 120 parts by weight of a reinforcing filler containing carbon black based on 100 parts by weight the diene rubber, of which a nitrogen adsorbing-specific surface area is 100 to 250 m²/g, an iodine adsorption amount is 110 to 200 mg/g and a ratio of cetyltrimethylammonium bromide adsorbing-specific surface area to the iodine adsorption amount is 0.85 to 1.2 and 10 to 100 parts by weight of silica based on 100 parts by weight of the diene rubber;
2 to 50 parts by weight of a styrene-butadiene polymer of which the weight average molecular weight is 1,000 to 15,000, the amount of a styrene is 17 to 27% by weight and the amount of vinyl contribution from butadiene is 60 to 80% by weight: and
2 to 25 parts by weight of an indene resin, of which the melting point is 100 to 150° C. based on 100 parts by weight of the diene rubber which comprises 60 to 95% by weight of a solution polymerization styrene-butadiene rubber, wherein weight average molecular weight is 500,000 to 2,500,000, the amount of styrene is 20 to 40% by weight and the amount of vinyl contribution from butadiene is 30 to 60% by weight and 5 to 40% by weight of a natural rubber and/or a butadiene rubber, and
the rubber composition further comprising 2 to 12 parts by weight of a silane coupling agent represented by the following formula:

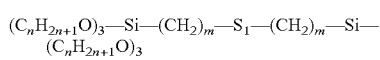

wherein n is an integer of 1 to 3, m is an integer of 1 to 4 and the average value of l is 1.8 to 3.5 based on 100 parts by weight of said silica, and
the rubber composition is obtained by kneading at a condition of at least 150° C.

2. A tire having a tread comprising the rubber composition of claim 1.

3. The rubber composition of claim 1 wherein the styrene-butadiene polymer is substantially free of hydrogenation.

* * * * *